United States Patent [19]
Lebby et al.

[11] Patent Number: 6,069,593
[45] Date of Patent: May 30, 2000

[54] DISPLAY CARRIER AND ELECTRONIC DISPLAY CONTROL FOR MULTIPLE DISPLAYS IN A PORTABLE ELECTRONIC DEVICE

[75] Inventors: Michael S. Lebby, Apache Junction; Davis H. Hartman, Chandler, both of Ariz.

[73] Assignee: Motorola, Inc., Schaumburg, Ill.

[21] Appl. No.: 09/028,539

[22] Filed: Feb. 24, 1998

[51] Int. Cl.[7] .................................................. G09G 5/00
[52] U.S. Cl. ............................. 345/1; 345/169; 455/557
[58] Field of Search .................................. 345/158, 169, 345/1, 2, 7; 340/825.44; 455/550, 556, 557, 566, 575, 90

[56] References Cited

U.S. PATENT DOCUMENTS

| | | |
|---|---|---|
| 4,481,382 | 11/1984 | Villa-Real . |
| 5,491,491 | 2/1996 | Lebby et al. .................................. 345/7 |
| 5,854,984 | 12/1998 | Buhrmann et al. ...................... 455/575 |
| 5,859,594 | 1/1999 | King et al. .......................... 340/825.44 |
| 5,884,155 | 3/1999 | Wicks et al. ............................... 455/90 |
| 5,924,044 | 7/1999 | Vannatta et al. ......................... 455/575 |

*Primary Examiner*—Regina Liang
*Attorney, Agent, or Firm*—Rennie William Dover

[57] ABSTRACT

A portable electronic device including a display carrier detachably mounted to the portable electronic device. The display carrier including a plurality of display apparatus and an electronic display control. A data communication interface is provided between the display carrier and the portable electronic device for permitting data exchange between the plurality of display apparatus and the portable electronic device. The electronic display control, including a display management chip, controls the operation of the plurality of displays dependent upon the power source supplying power to the portable communication device.

12 Claims, 2 Drawing Sheets

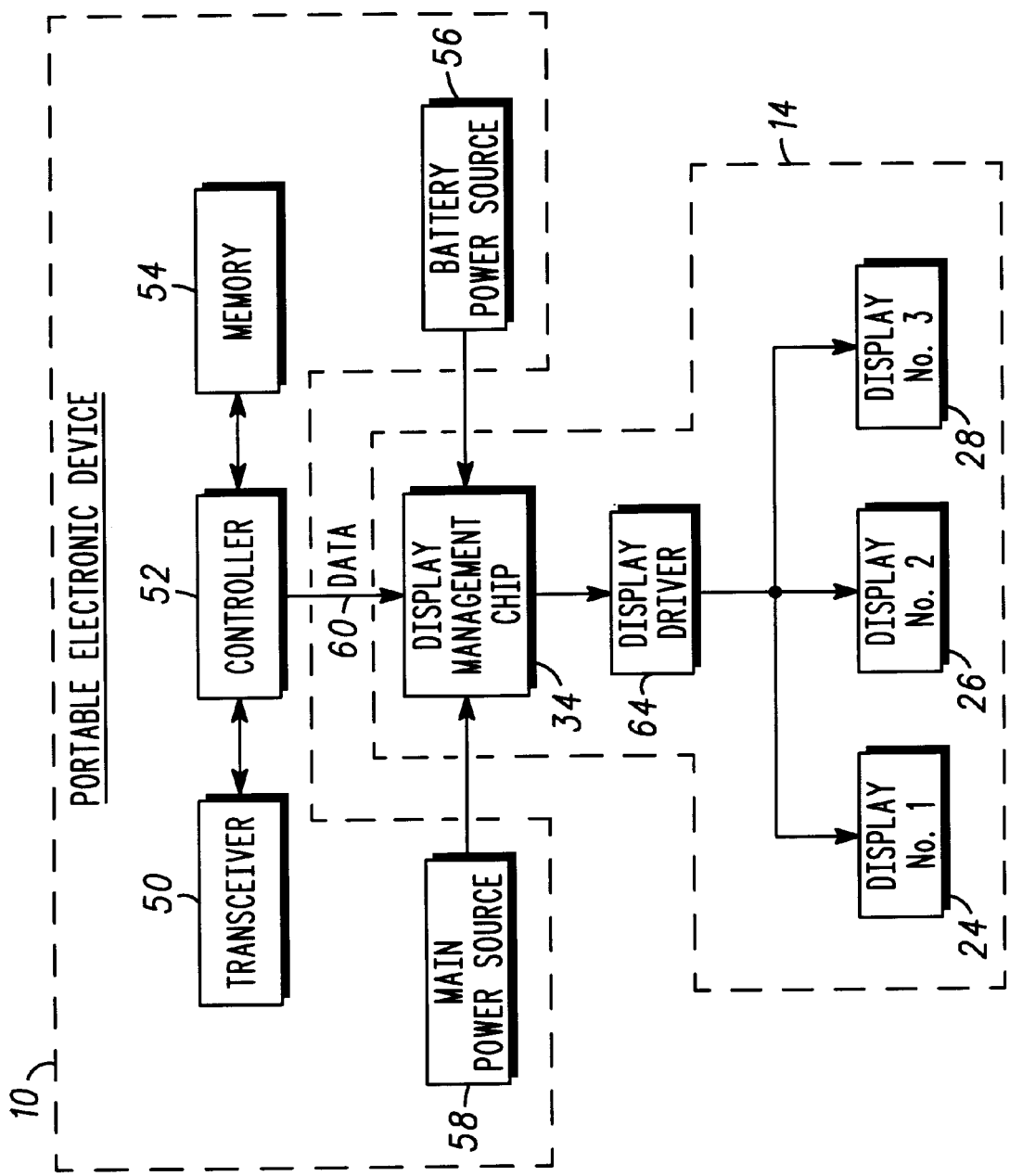

DISPLAY CARRIER AND ELECTRONIC DISPLAY CONTROL FOR MULTIPLE DISPLAYS IN A PORTABLE ELECTRONIC DEVICE

FIELD OF THE INVENTION

The present invention pertains to a plurality of displays in association with a portable electronic device. More particularly, this invention pertains to the plurality of displays and the electronic control of the plurality of displays using a semiconductor management chip.

BACKGROUND OF THE INVENTION

Portable electronics equipment, such as radios, cellular and cordless telephones, pagers and the like, are becoming increasingly popular. In many instances it is desirable to provide apparatus on the equipment to supply the operator with visual messages that include graphics and printed information as well as a means to access and manipulate such messages. The problem is that prior art apparatus providing these functions require relatively high electrical power and require a great amount of area to be sufficiently large to produce useful and visually perceivable information.

In the prior art, for example, it is common to provide visual apparatus utilizing liquid crystals, directly viewed light emitting diodes, etc. These produce very large and cumbersome displays that greatly increase the size of the receiver and require relatively large amounts of power.

Apparatus incorporating a miniature virtual image, which solves most of the problems mentioned above, is disclosed, for example, in U.S. Pat. No. 5,224,198, entitled "WAVEGUIDE VIRTUAL IMAGE DISPLAY", issued Jun. 29, 1993. Typically, the products in which the miniature virtual image display is incorporated are small handheld devices.

Typically, in portable electronics equipment, such as radios, cellular and cordless telephone.,, pagers and the like, there exists a small display which illustrates the number being dialed or the function being programmed. Greater capabilities in terms of displayed information can be achieved by adding an additional display or displays to the portable electronics equipment. Of concern is the positioning of these additional displays and the considerable power required for the display module and associated electronics.

Therefore, there exists a need to provide for a detachable display carrier that has loused therein a plurality of displays, that in combination with an electronic display control provides for lower power drain on a power source of a portable electronic device.

Accordingly, it is a purpose of the present invention to provide for a display carrier including an electronic display control for management of a plurality of displays housed in the display carrier, the display carrier and the electronic display control utilized in conjunction with an existing portable electronic device.

It is also a purpose of the present invention to provide for a display management chip for electronic display control of a plurality of displays utilized in conjunction with an existing portable electronic device.

It is a further purpose of the present invention to provide for a new and improved electronic display control of a plurality of displays of a portable electronic device, which enables the plurality of displays and thus data contained within the product to be accessed and thus viewable by the user with lower power drain to the power source.

SUMMARY OF THE INVENTION

The above problems and others are at least partially solved and the above purposes and others are realized in a portable electronic device including a display carrier having housed therein a plurality of displays and an electronic display control. The electronic display control is operational to control the plurality of displays housed within the display carrier dependent upon power source, thus permitting the conservation of power consumption.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

FIG. 3 is a simplified block diagram of the electronics associated with the detachable display carrier with electronic display control for use with a portable electronic device according to the present invention.

DESCRIPTION OF THE PREFERRED EMBODIMENTS

Figure 1:
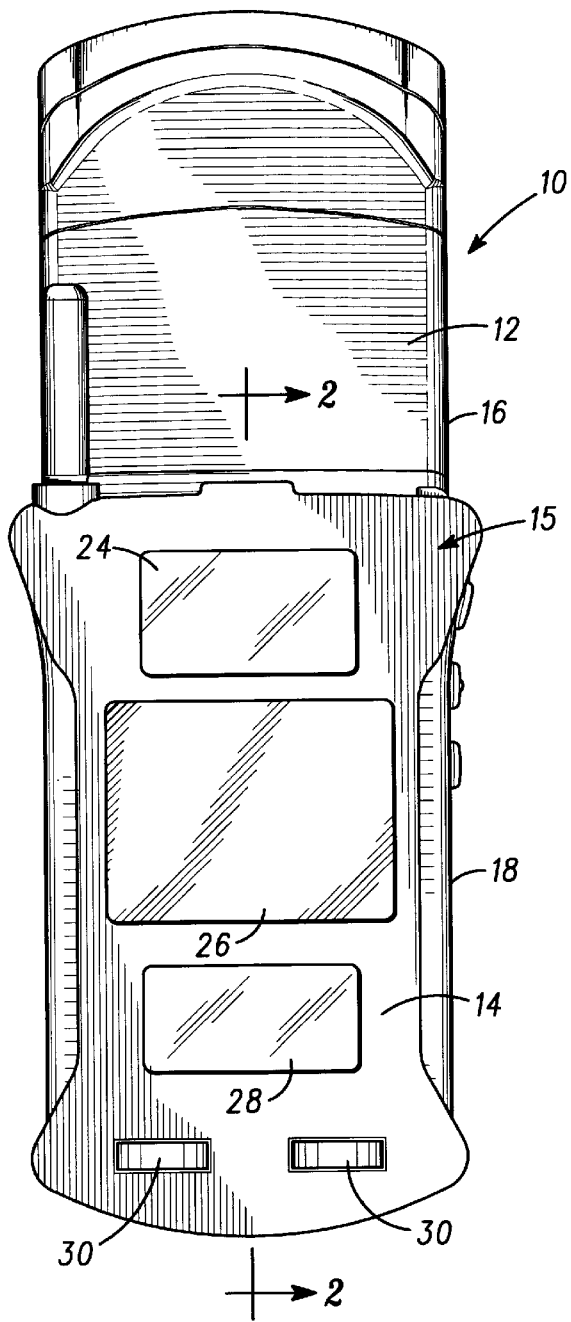
FIG. 1 is a simplified schematic view of a portable electronic device with a detachable display carrier according to the present invention.

Referring specifically to FIG. 1, illustrated in simplified schematic view is a portable electronic device 10 with a power source 12, more particularly a battery, and further illustrating the attachment of a display carrier 14 detachably positioned on portable electronic device 10. In this particular embodiment, portable electronic device 10 is generally illustrated as a portable communications device, such as a cellular telephone, but may include any type of portable electronics equipment, or portable/handheld communication receiver, including a pager, two-way radio, or a transceiving device such as a portable telephone, or the like. Portable electronic device 10 is fabricated having hinged first major portion 16 and second major portion 18. First major portion 16 and second major portion 18 are hingeably attached so as to allow for the positioning of first major portion 16 and second major portion 18 on top of each other when portable electronic device 10 is in a closed or non-operational position. Display carrier 14 includes in this particular embodiment a plurality of display apparatus 15 for viewing displayed images. More particularly, display carrier 14 includes a virtual display 24, a large direct view display 26, and a small direct view display 28. It should be understood that any combination of displays 24, 26 and 28 can be included dependent upon the specific application for display carrier 14, more particularly portable electronic device 10.

Figure 2:
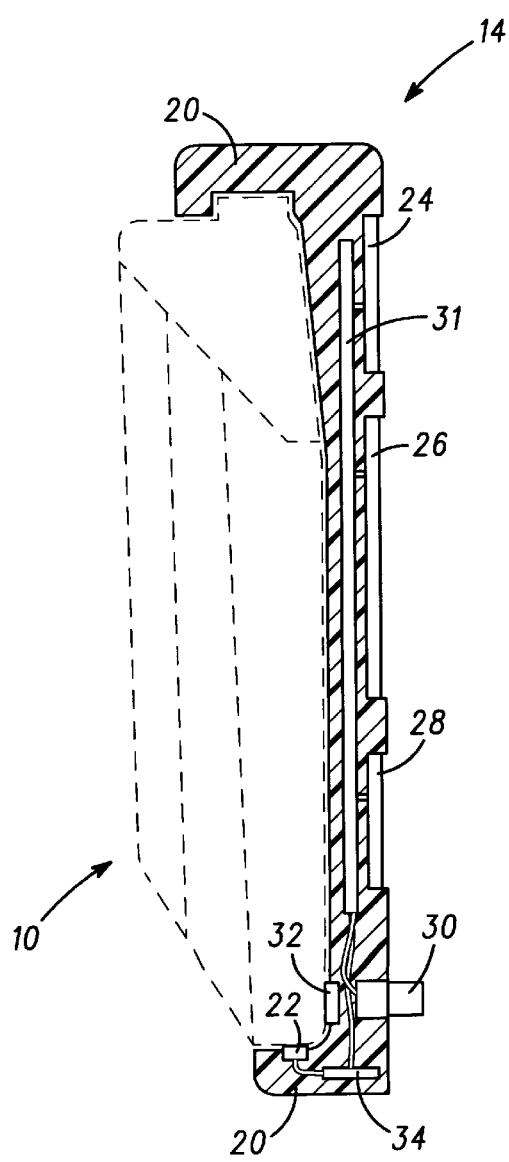
FIG. 2 is a simplified schematic cross-sectional view taken through line 2—2 of FIG. 1 illustrating the display carrier and plurality of displays of the present invention.

As illustrated in FIG. 1, there is positioned on a rear side of first major portion 16 of portable electronic device 10, battery 12 in electrical interface with portable electronic device 10. Battery 12 provides power to portable electronic device 10 during portable usage. It should additionally be understood that there is provided on portable electronic device 10 a receptacle (not shown) for operation of portable electronic device 10 with a hardwired power source such as an AC/DC power source Display carrier 14 is detachably mounted to portable electronic device 10 utilizing snap-fit connections 20 (as also illustrated in FIG. 2) and having electronic interface with portable electronic device 10 through the standard provided phone connection plate 22 on the base of second major portion 18 (as illustrated in FIG. 2). There is provided a wireless communication port 32 such as for use with infra red signals, radio frequency signals, or the like. Wireless communication port 32 (as illustrated in FIG. 2) is included to serve as a means for communication of signals, more specifically, a data communication interface, between display carrier 14 and portable electronic device 10. More particularly, it is anticipated by this disclosure to include a data interface between display carrier 14 in the form of standard electrical interface 22, such as an electrical connector or solid form factor design, or a wireless link, such as an infra-red optical link or infra-red link. In the instance when an infra-red optical link is provided, a vertical cavity surface emitting laser (VCSEL) based free-space interconnect between the control electronics (discussed presently) of the device and the display carrier 14 is anticipated. The use of a semiconductor eased optical link allows for data transmission rates on the order of 1 Gbps to be achieved which helps the display electronics read and image the data easier and faster.

Referring now to FIG. 2, illustrated is display carrier 14 positioned on portable electronic device 10. Display carrier 14 is generally formed to include virtual image display 24, characterized as displaying informative data, such as a complete frame of alphagraphics, contained within portable electronic device 10, a large direct view display 26 and a small direct view display 28. Further information on virtual image displays, such as that utilized for display 24 can be found in U.S. Pat. No. 5,224,198, entitled "WAVEGUIDE VIRTUAL IMAGE DISPLAY", issued Jun. 29, 1993, assigned to the same assignee and incorporated herein by this reference. It should be understood that direct view displays 26 and 28 are described in size relative to each other, with display 26 generally larger than display 28. In this particular embodiment, virtual image display 24 has provided dual modes of magnification. Large direct view display 26 is a non-emissive liquid crystal display (LCD) and small direct view display 28 is an emissive display such as one utilizing organic electroluminescent technology.

Display carrier 14 further includes a plurality of user and control function buttons 30 (as illustrated in FIGS. 1 and 2) which upon activation correlate to responsive cursor movement and/or control display operations in displays 24, 26 and/or 28 of display carrier 14. It should be understood that display carrier 14 in this particular embodiment is formed so as to be detachable from portable electronic device 10, for use separate and apart from portable electronic device 10. As previously stated, display carrier 14 may include a wireless connection so as to be in communication interface with portable electronic device 10. In this particular embodiment, display carrier 14 is in wireless communication with portable electronic device 10 by way of infra red connection port 32 thus signals between display carrier 14 and portable electronic device 10 are wirelessly communicated to display carrier 14 and ultimately to displays 24, 26 and/or 28 through an internal data bus 31 which carries data, interfaced with displays 24, 26 and 28.

Display carrier 14 further includes an electronic display control, in this particular embodiment formed as a display management chip 34, in electrical interface with displays 24, 26 and 28. Electronic display control, or display management chip 34, serves to control the operation of displays 24, 26 and 28 according to the power source being utilized to operate portable electronic device 10. Generally, when a main hardwired power source (previously described) is providing power to portable electronic device 10, displays 24, 26 and 28 are capable of being "ON" simultaneously. When power is being supplied to portable electronic device through battery power source 12, only one display, either 24, 26 or 28 is capable of being "ON". In this instance, the user would have control of which one display is "ON", more particularly preferred viewing operation, through function buttons 30. This ability for the electronic control of displays 24, 26 and 28 enables lower power drain on battery source 12.

During operation, a user of portable electronic device 10 having positioned on a rear surface of second major portion 18 display carrier 14, is able to control displays 24, 26 and 28 through function control buttons 30. It should be understood that while a specific type and orientation of function control buttons 30 is illustrated, that any variety of controlling buttons, etc. can be used such as a trackball, a slide bar, touch buttons, or the like. Each individual button 30 is interfaced with cursor electronics (not shown) for controlling displays 24, 26 and 28, with each button 30 typically characterized as serving as a separately programmed function button Portable electronic device 10 is designed to be held by an operator with one hand. Electronics (discussed presently) are mounted in the detachable display carrier 14 and connected to the cursor electronic (not shown) for producing functionally responsive displays 24, 26 and 28. An ON/OFF or power switch (not shown) is located on equipment 10, thereby allowing the user to power "ON" or turn "OFF" the equipment as necessary. Other means of activating and deactivating power to portable electronic device 10, more particularly displays 24, 26 and 28, are anticipated by this disclosure. Once power to portable electronic device 10 is activated, dependent upon power source, displays 24, 26 and 28 would become operational through buttons 30, which is translated into control of display 24, 26 and 28.

Referring specifically to FIG. 3, a block diagram of the electronics for portable electronic device 10 and display carrier 14 embodying the present invention is illustrated. Portable electronic device 10 can be any of the well known portable receivers, such as a cellular or cordless telephone, a two-way radio, a pager, etc. Portable electronic device 10 generally includes a transceiver 50 having a data output connected to a controller 52 which may be a microprocessor, a DSP, a gate array, specially designed logic circuits, etc. A memory 54 is connected to controller 52 and stores information and messages, graphic and/or alpha-numeric, received by receiver 50 in accordance with the programming of controller 52. In addition, memory 54 stores a plurality of cursor manipulation functions for controlling the cursor in displays 24, 26 and 28. Cursor electronics (not shown), driven by memory 54, are also connected to an input or inputs of controller 52 through wired or wireless connection 60. Battery source 56 and a wired main power source 58 supply power to portable electronic device 10.

Display management chip 34 receives signals from controller 52 and power sources 56 and 58. Dependent upon the power source being utilized, a signal is submitted to a display driver 64 which determines operation of displays 24, 26, and 28. As previously detailed, when main power source 58 is utilized, display management chip 34 generates signals to display driver 64 driving the simultaneous operation of displays 24, 26 and 28. Alternatively, when battery power source 56 is utilized, display management chip 34 generates signals to display driver 64 driving the operation of displays 24, 26 and 28 one at a time.

Accordingly, a new and improved detachable display carrier and electronic display control for use with a portable electronic device, such as a portable communications device, is disclosed. The new and improved detachable display carrier and electronic display control is designed for use in small handheld electronic devices and is situated so as to allow the user to view a plurality of additional displays on the electronic device. Thus, a display carrier, housing a plurality of displays, electronically controlled dependent upon the supplying power source is disclosed which is small and easy to operate so that it can be detachably incorporated into very small electronic equipment, such as radios, cellular and cordless telephones, pagers, data banks and the like.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A portable electronic device with removable display carrier comprising:
    a handheld electronic device;
    a power source interfaced with the handheld electronic device providing operating power to the handheld electronic device for complete stand-alone operation of the handheld electronic device; and
    a detachable accessory for the handheld electronic device including
        a detachable display carrier mounted on the handheld electronic device and including a plurality of display apparatus for viewing of displayed images by an operator, the plurality of display apparatus including display electronics,
        an electronic display control mounted in the display carrier and in electrical interface with the display electronics and the portable electronic device for producing in combination with a display driver a plurality of responsive displays, and
        a data communication interface between the display carrier and the handheld electronic device for providing display data to the display electronics from the handheld electronic device,
        whereby, when the display carrier is attached to the handheld electronic device the handheld electronic device is provided with at least one display of data from the handheld electronic device.

2. A portable electronic device with removable display carrier as claimed in claim 1 wherein the power source is interchangeable between a portable battery power source and a hardwired power source.

3. A portable electronic device with removable display carrier as claimed in claim 1 wherein the plurality of display apparatus include at least one of a virtual image display apparatus for providing a virtual image of a complete frame of alphagraphics in the virtual image display apparatus and a direct view display apparatus for providing a direct view image in the direct view display apparatus.

4. A portable electronic device with removable display carrier as claimed in claim 1 wherein the electrical interface with the display electronics includes a wireless connection.

5. A portable electronic device with removable display carrier as claimed in claim 4 wherein the wireless connection includes an infra red optical link.

6. A portable electronic device with removable display carrier as claimed in claim 4 wherein the wireless connection includes a radio frequency link.

7. A portable electronic device with removable display carrier as claimed in claim 1 wherein the electrical interface with the display electronics includes an electrical connector interface.

8. A portable electronic device with removable display carrier as claimed in claim 1 wherein the electrical interface with display electronics includes a solid form factor design including contact areas located on the display apparatus and the power source.

9. A portable electronic device with removable display carrier as claimed in claim 1 wherein the electronic display control includes circuits for controlling the plurality of display apparatus in response to the power source.

10. A portable electronic device with removable display carrier comprising:
    a handheld communication receiver;
    a power source interfaced with the handheld communication receiver for supplying power to the handheld communication receiver for complete stand-alone operation of the handheld communication receiver; and
    a detachable accessory for the handheld communication receiver including
        a display carrier including a plurality of display apparatus, electrically connected to and detachably mounted on the portable electronic device, each display apparatus having a viewing aperture,
        a display management chip interfaced with the power source of the portable electronic device and the plurality of display apparatus, the display management chip characterized as controlling the display of the plurality of display apparatus, and
        a data communication interface between the display carrier and the handheld communication receiver for data transmission between the handheld communication receiver and the plurality of display apparatus of the display carrier,
        whereby, when the display carrier is attached to the handheld communication receiver the handheld communication receiver is provided with at least one display of data from the handheld communication receiver.

11. A portable electronic device with removable display carrier as claimed in claim 10 wherein the display management chip provides for simultaneous operation of the plurality of display apparatus when a hardwired power source is supplying power to the portable electronic device.

12. A portable electronic device with removable display as claimed in claim 10 wherein the display management chip provides for select operation of one of the plurality of display apparatus when a battery power source is supplying power to the portable electronic device.

* * * * *